Dec. 17, 1929.  W. J. SNYDER ET AL  1,740,377
CHUCK
Filed May 25, 1928
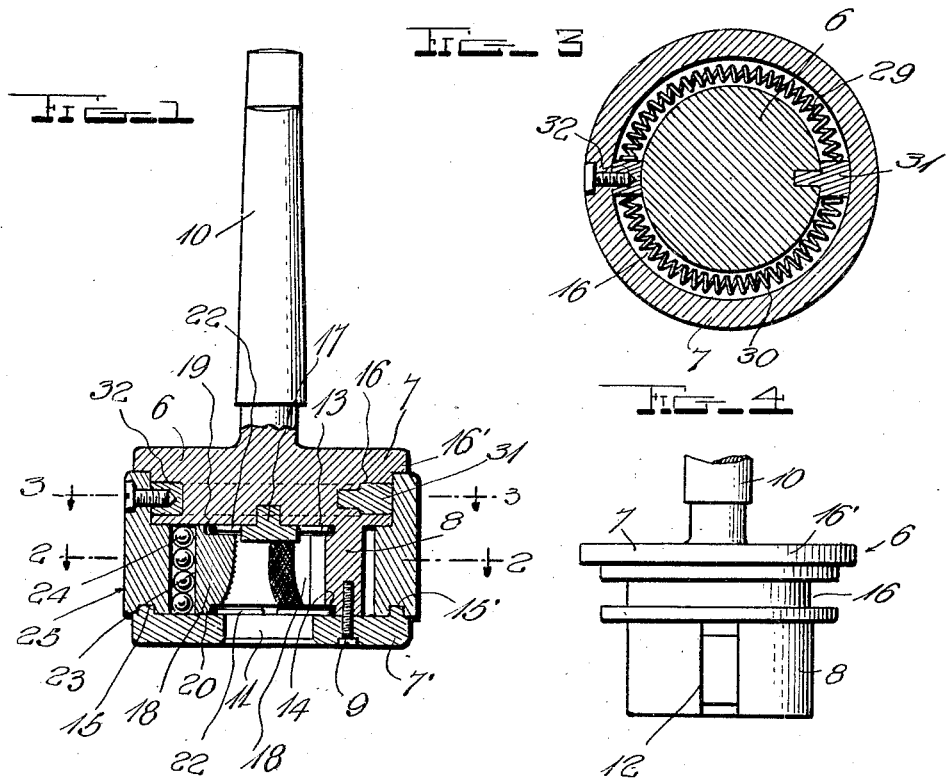
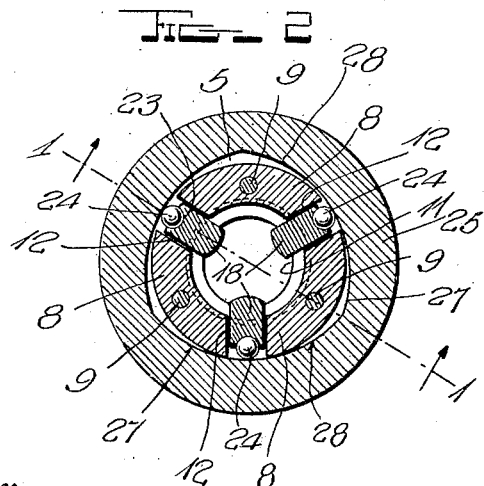
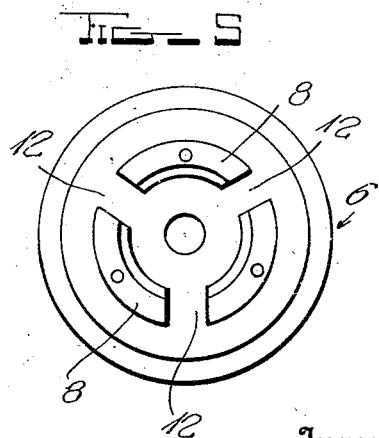
Witness
Inventors
William J. Snyder
Edward C. Ahlheim
By
Attorneys Patented Dec. 17, 1929

1,740,377

UNITED STATES PATENT OFFICE

WILLIAM JOHN SNYDER AND EDWARD C. AHLHEIM, OF FRANKLIN, PENNSYLVANIA

CHUCK

Application filed May 25, 1928. Serial No. 280,500.

The invention relates to work driving chucks and more particularly to one designed primarily for use in boiler work for either rapidly driving or removing stay bolts. It is usually customary to perform this work by hand but we are aware that one stay bolt driver has been designed for the purpose of rotating the bolts by power. This device, however, necessitates that the bolts be squared on one end, entailing an additional and appreciable expense.

It is the object of the invention to provide a generally improved construction, in which novel provision is made for retracting the jaws and in which said jaws are provided with unique bearing means for engaging cams by which they are projected.

With the foregoing in view, the invention resides in the novel subject matter hereinafter described and claimed, description being accomplished by reference to the accompanying drawing.

Fig. 1 is a vertical sectional view on line 1—1 of Fig. 2 partly in elevation.

Figs. 2 and 3 are horizontal sectional views on lines 2—2 and 3—3 respectively of Fig. 1.

Fig. 4 is a side elevation of a portion of the head and its driving shank.

Fig. 5 is a bottom plan view of the part shown in Fig. 4.

The chuck embodies a head denoted in a general way by the numeral 6, said head including upper and lower relatively thick and thin disks 7—7', a circular wall 8 between and concentric with said disks and spaced inwardly from the peripheral edges thereof, said wall being integral with the disk 7, and means such as the screws 9, securing the disk 7' to said wall 8. Disk 7 is integral with a driving shank 10, disk 7' is formed with a work-receiving opening 11, and wall 8 is formed with a plurality of radial slots 12 opening through both its inner and outer peripheries, and extending from the disk 7 to the disk 7'. The inner side of wall 8 is formed with upper and lower grooves 13—14 adjacent the disks 7—7', and around said wall near the periphery of the disk 7', the inner side of the latter is formed with a continuous rib 15. The periphery of disk 7 is formed with a circumferential groove 16 and with an outstanding rib 16' above said groove. The center of the disk 7 carries a hardened thrust button 17 for contact with the work which passes through the opening 11, said button having a reduced portion securely held in a socket in said disk.

Work-gripping jaws 18 are slidably mounted in the slots 12 in abutting relation with the disks 7—7', and at their inner ends are provided with appropriate curved and serrated work-engaging faces, said inner ends being also formed with notches 19—20 which register with the grooves 13—14. Self-expanding spring rings 22 are received in the notches 19—20 and the registering grooves 13—14 and serve to exert a constant outward force tending to retract or release the jaws 18.

The outer ends of the jaws 18 are formed with vertical grooves 23 receiving bearing balls 24. These balls contact with the inner side of a ring 25 which rotatably surrounds the wall 8, extends across the groove 16, and at its upper edge abuts rib 16'. The lower edge of ring 25 is formed with a groove 15' receiving the rib 15. As the springs 22 constantly force the jaws 18 outwardly, they maintain the balls 24 in contact with the ring 25 and hence said balls are prevented from accidentally falling out of the grooves 23. The inner side of ring 25 is provided with a plurality of cams 27 for inwardly projecting the jaws 18 when the ring is turned in one direction and is also formed with a plurality of cams 28 for inwardly projecting the jaws 18 when the ring is turned in the other direction. Two coiled compression springs 29—30 are disposed in the groove 16 and at one end abut a stop 31 therein. The other ends of these springs abut a stop 32 on the ring 25 and serve to hold said ring in its maximum jaw-projecting position. Turning of the ring in either direction permits springs 22 to retract the jaws for initial positioning of said jaws around the work, and release of said ring, causes one or the other of the springs 29—30 to again turn said ring in jaw-projecting direction. Ring 25 is turned in one direction when the work is to be rotated clockwise and in the other direction for counterclockwise rotation of the work.

In assembling the chuck, the springs 29—30 are disposed in the groove 16 against the stop 31, the ring 25 is positioned and the stop 32 inserted and secured. Then, with the structure inverted, the jaws 18 are positioned in the slots 12 and the springs 21—22 are placed in position to outwardly force said jaws. These jaws may now be inwardly pulled to permit dropping of the bearing balls 24 into the grooves 23 and when this has been done, the disk 7' is secured in place by the screws 9 or other desired means provided for this purpose. The chuck thus lends itself to quick and easy assembly and may be disassembled with equal ease whenever repairs are necessary.

In operating the chuck, ring 25 is turned to effect retraction of the jaws 18, the bolt or the like to be driven is started into its receiving opening and the chuck head is positioned so that the thrust button 16 rests upon the outer end of the bolt, the latter passing through the opening 11. The ring 25 is now released and one or the other of the springs 29—30 turns said ring, causing one or the other set of its cams 27—28 to inwardly force the balls 24 and the jaws 18, thus engaging these jaws with the work so that the latter may be driven. When the work is almost completely driven, the operator slows down the driving of the chuck and finally stops it, and said chuck is then released by again turning the ring 25.

When removing bolts or the like or driving other parts in a reverse direction from that above explained, it is simply necessary to reverse the direction of rotation of the head 5 and to turn ring 25 in the other direction to engage the chuck with the work. Thereafter, all parts function exactly as above explained, except that the set of cams which was previously idle and the previously idle spring (29—30) now come into play to project the jaws 18.

The device is extremely simple and compact, may be inexpensively manufactured and sold at small cost, in numerous fields of duty will be of exceptional advantage, and when used as a stay-bolt driver saves work and material now necessary in constructing the stay-bolts for the drivers heretofore used. On account of such characteristics, we prefer to employ the construction shown. However, within the scope of the invention as claimed, variations may be made as above stated.

We claim:—

1. In a chuck, a head having two axially alined disks disposed in parallel planes, and a circular wall concentric with said disks and extending between them in inwardly spaced relation with the peripheral edges thereof; said wall being formed with internal grooves near said disks and having radial slots from its inner to its outer side and extending from one disk to the other; a ring surrounding and outwardly spaced from said wall and rotatably mounted between the peripheral portions of said disks, the inner side of said ring having cams, work-gripping jaws slidable in said slots and disposed in abutting relation with said disks, the outer ends of said jaws being co-operable with said cams, and the inner ends of said jaws being formed with notches registering with the aforesaid grooves; and self-expansible rings in said notches and grooves for outwardly sliding said jaws.

2. In a chuck, a head having two axially alined disks disposed in parallel planes, and a circular wall concentric with said disks and extending between them in inwardly spaced relation with the peripheral edges thereof, said wall having radial slots from its inner to its outer side and extending from one disk to the other; a ring surrounding and outwardly spaced from said wall and rotatably mounted between the peripheral portions of said disks, the inner side of said ring having cams, work-gripping jaws slidable in said slots and disposed in abutting relation with said disks, the outer ends of said jaws being formed with grooves from one disk to the other, and bearing members in said grooves of said jaws and held therein by contact with said disks and said cams.

In testimony whereof we have hereunto affixed our signatures.

WILLIAM JOHN SNYDER.
EDWARD CHAS. AHLHEIM.